Dec. 21, 1954   C. E. JOHNSON ET AL   2,697,722
MANUFACTURE OF SULFONIC ACIDS
Filed Jan. 13, 1951
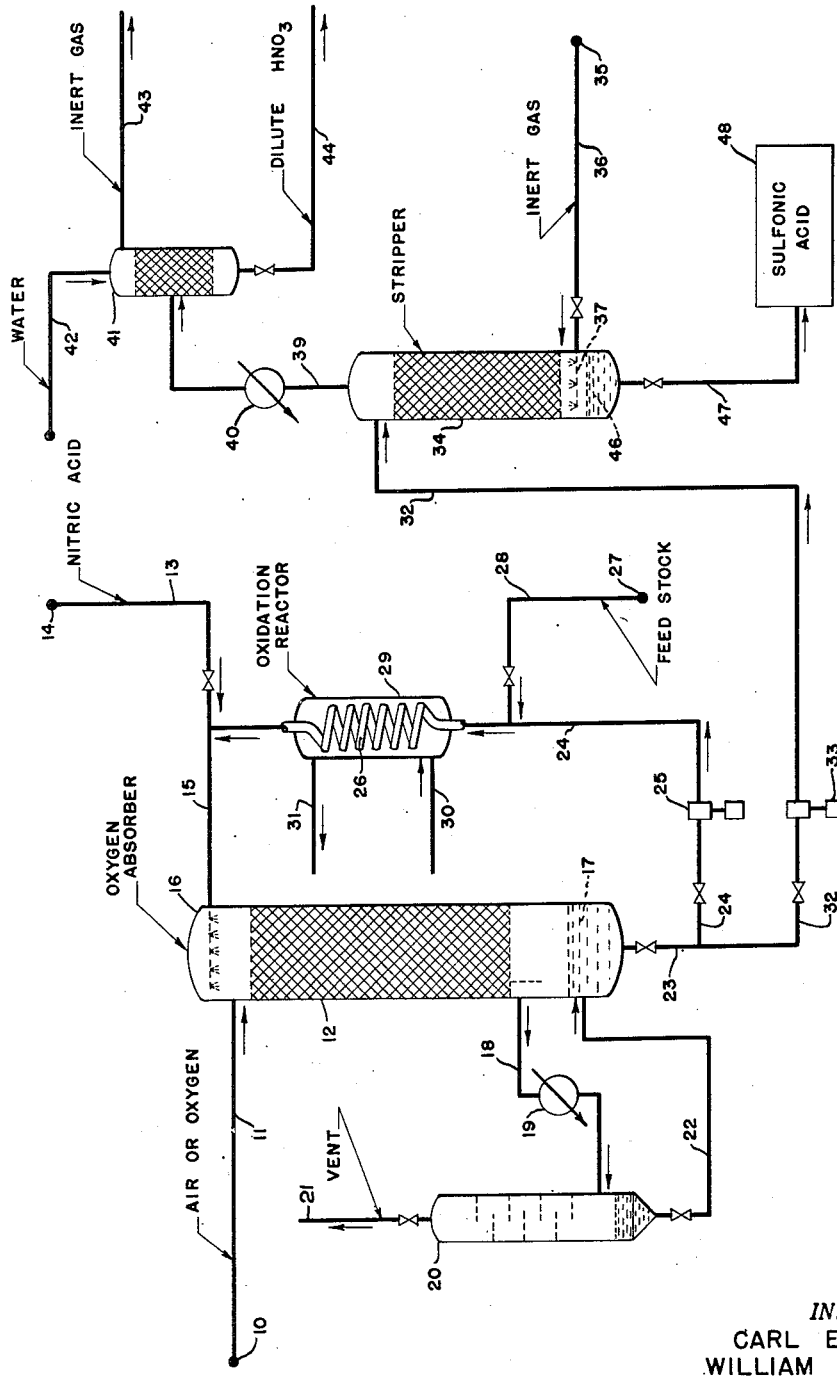
INVENTORS:
CARL E. JOHNSON
WILLIAM F. WOLFF
BY:
ATTORNEY:

United States Patent Office 2,697,722
Patented Dec. 21, 1954

2,697,722

MANUFACTURE OF SULFONIC ACIDS

Carl E. Johnson, Griffith, Ind., and William F. Wolff, Lansing, Ill., assignors to Standard Oil Company, Chicago, Ill., a corporation of Indiana Application January 13, 1951, Serial No. 205,902

11 Claims. (Cl. 260—513)

This invention relates to an improved process for preparing alkanesulfonic acids. More particularly it relates to improvements in a process for the catalytic oxidation of organic sulfur compounds having the general formula $RS_nR'$ wherein R and R' are organic radicals and $n$ is an integer having inclusively a value of one to six.

Processes are described in U. S. Patents 2,433,395 and 2,433,396 for the production of organic sulfonic acids, particularly hydrocarbon sulfonic acids such as alkanesulfonic acids. In these processes, the alkyl sulfide or polysulfide is oxidized by a gas containing free oxygen in the presence of a catalyst selected from the group consisting of NO, $NO_2$, $N_2O_3$, $N_2O_4$ and $N_2O_5$, which may be generated in the reaction zone by nitric acid. The several intermediate oxidation stages that may occur during the process may be summarized by the equation:

$$2RSSR + 5O_2 + 2H_2O = 4RSO_3H$$

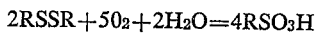

In these processes a feed stock containing the said organic sulfide is fed to a reaction zone and there it is treated with a gas containing free oxygen and catalytic quantities of a nitrogen oxide or nitric acid. The said patents disclose the fact that at certain concentration of sulfonic acid in the reaction mixture, this acid and unconverted sulfides will become miscible and the rate of solution of oxygen and the consequent rate of acid formation will drop rapidly to about one-third the former rate. Provision to avoid this reduction in rate is disclosed in U. S. Patent 2,489,318.

The product of the foregoing processes is usually a "pale, reddish-brown colored product." It is necessary to bleach this product with concentrated nitric acid in order to remove color and odor bodies, primarily incompletely oxidized materials, from the reaction product.

The primary object of the present invention is the provision of an improved process of manufacture of alkanesulfonic acids. Another object of the invention is the provision of a process for the oxidation of hydrocarbon sulfides and polysulfides and the direct single-stage preparation thereby of substantially colorless, odorless sulfonic acids. A further object of the invention is the provision of a process of oxidizing the said hydrocarbon sulfides whereby reduction in reaction rates heretofore encountered during the course of the reaction is entirely avoided while at the same time avoiding the use of elevated temperatures which tend to form additional color bodies and other decomposition products.

Briefly stated the present invention comprises the introduction of relatively small quantities of feed stock consisting of hydrocarbon sulfides or polysulfides into large quantities of nitric acid which contain absorbed oxygen. Preferably the feed stock is fed continuously at a relatively slow rate into the nitric acid containing the oxygen. Instead of employing catalytic quantities of nitric acid, at least one mol of nitric acid per mol of feed stock is employed. The nitric acid nevertheless continues to act as a catalyst and not as a reactant, and acts also as an absorption medium to supply the sulfide reactant with immediately available quantities of absorbed free oxygen. Oxidation, thereby of the feed stock is substantially instantaneous. Since the oxygen is previously absorbed in the nitric acid and is supplied therewith at a rate sufficient to immediately oxidize the feed stock, no problem of the rate of absorption of the feed stock in the nitric acid is encountered. This continuing supply of available oxygen to the feed stock in the presence of large quantities of the catalyst effects such a complete oxidation that product directly removed therefrom contains substantially no odor or color bodies. The reaction product is immediately suitable without further treatment for use as a catalyst for those organic syntheses wherein contamination must be carefully avoided.

In carrying out our improved process wherein organic sulfides and polysulfides are added to nitric acids in the presence of air or oxygen instead of adding acid to the sulfides, aqueous nitric acid of about 10 percent to 70 percent nitric acid content and preferably of about 35 percent to 50 percent nitric acid is charged to a circulating system which is maintained under a pressure of introduced air or oxygen between about 1 and 200 pounds per square inch gage and preferably at about 50 pounds per square inch gage. A hydrocarbon sulfide and preferably a disulfide is then introduced into nitric acid containing the absorbed oxygen. In a batch process reaction is preferably discontinued after the nitric acid has been diluted with about an equal volume of the formed sulfonic acid. In this type of process, the nitric acid will have absorbed from about 0.5 to 5 cubic feet of oxygen per gram mol of nitric acid. The total quantity of nitric acid present as catalyst in a batch process should be in the range of about 0.1 to 10.0 mols per mol of hydrocarbon sulfide and preferably between 0.2 and 1.5 mols. In a continuous process the ratio of nitric acid catalyst to introduced disulfide will at any moment of course be so high as to be meaningless. An adequate volume of nitric acid should be present to act as an oxygen absorbent and carry sufficient oxygen to the disulfide to effect substantially instantaneous oxidation.

The temperature of the slightly exothermic reaction is maintained by cooling the reactants, preferably with cold water in a jacket, around the reaction zone, to a temperature within the range of about 10° to 130° C. and preferably about 15° to 60° C. The sulfide is immediately oxidized upon introduction into the acid. The absorbed oxygen is apparently in part employed in regenerating nitric acid by oxidation of nitric oxide to nitrogen peroxide.

The so-prepared sulfonic acid forms, with the nitric acid and possibly with nitrogen oxides contained therein, a complex from which the sulfonic acid can readily be liberated by a stripping operation.

When the process is operated continuously, one portion of product containing regenerated nitric acid is recycled and comes in contact with further quantities of hydrocarbon sulfides. Another portion of the product in the said form of the complex with the regenerated nitric acid is stripped with an inert gas preferably containing some oxygen, at 80° to 150° C. and preferably at about 80° to 100° C. Effluent gases are cooled, scrubbed with water to remove nitric acid and vented. Dilute nitric acid recovered by the scrubbing step can be concentrated and returned to the oxygen absorber or it can be directly returned to the absorber.

Stripped sulfonic acids of substantially no odor and water white color are recovered from the stripping step. The acids are quite low in sulfate content and in reducing impurities as indicated by the permanganate number, having less than one-fourth the impurities displayed by sulfonic acids produced by the known processes.

Feed stocks suitable for the improved catalytic oxidation process are the same as those described in the aforesaid patents. These organic sulfur compounds have the general formula $RS_nR'$ in which $n$ is any integer from one to six and the organic radicals R and R' may be the same or different and preferably are resistant to oxidation under the employed conditions. Suitable oxidation resistant organic radicals are aryl and alkyl radicals. Substituents which may or may not be oxidized under the conditions employed in the oxidation process may be present in the feed stock and may include unsaturated organic linkages, halogen, nitro, amino, amido, or other atoms or groups.

Particularly suitable as feed stocks for the process are symmetrical and asymmetrical disulfides where R and R' are each an alkyl group containing one to five carbon atoms. Hydrocarbon thioethers such as dimethyl sulfide or thiophene are also suitable.

The feed stock may be a pure compound or a mixture of compounds, optionally in admixture with substances, such as paraffin hydrocarbons which are not normally oxidized to an appreciable extent under the conditions employed in our process. A preferred feed stock is a mixture consisting essentially of dialkyl disulfides of the type obtained as a by-product in the extraction of mercaptans from petroleum distillates with a caustic-solutizer solution followed by regeneration of the solution in the presence of an oxidation catalyst to produce a mixture of dialkyl disulfides which are separated from the caustic solution by settling or by extraction with a solvent, such as petroleum hexane, naphtha, or the like. Either the crude disulfides or a fraction thereof can be oxidized by our technique.

The extraction of petroleum distillates with caustic-solutizer solutions has been described by D. L. Yabroff and E. R. White (Ind. Eng. Chem. 32, 950–953 (1940)) and has been reviewed by V. A. Kalichevsky and B. A. Stagner ("Chemical Refining of Petroleum"—revised edition—1942, pp. 218–220). The production of disulfides by catalytic oxidation of mercaptans (present as mercaptides) in caustic-solutizer solutions has been described by J. P. O'Donnell (The Oil and Gas Journal, pp. 45–47 (July 1, 1944)).

A brief description of caustic-solutizer extractions of mercaptan-containing petroleum fractions and conversion of the extracted mercaptans to hydrocarbon disulfides can be found in the aforesaid patents, for example U. S. 2,433,395, column 3 and need not be repeated here.

A representative dialkyl disulfide mixture produced by operation of the process of the caustic-solutizer type boils in the range of about 115° to about 400° F. with very little material distilling below about 250° F. A mixture of this type has been used in several of the specific examples reported herein. Fractionation analysis indicates that the predominant components are dimethyl, methyl ethyl, diethyl, methyl isopropyl, methyl n-propyl and dipropyl disulfides.

Polysulfides of the general formula $RS_nR'$ wherein $n$ is an integer between three and six can also be oxidized by our catalytic process. Numerous methods of preparing such polysulfides are known. Suitable methods, among others, are described in U. S. Patents 2,237,625 and 2,237,627 and in Liebig's Annalen der Chemie 359, 81 (1907). It should be understood that the methods for making polysulfides form no part of the present invention and that polysulfides, however made, can be subjected successfully to our oxidation process.

In the accompanying drawing the single figure is a schematic flow diagram illustrating a preferred arrangement of apparatus suitable for carrying out the process of invention.

Referring now to the drawing, a continuous process set up to produce about four tons a day of mixed alkanesulfonic acid is described. Air is passed at a rate of about 14,500 standard cubic feet per hour from a source 10 through the line 11 in which can be disposed a drier (not shown) and is forced into an oxygen absorber 12 which consists of a packed tower about twenty feet high. The packing can be, for example, hurdles or Raschig rings. The tower is maintained at a pressure of about 50 pounds per square inch gage. Nitric acid is flowed at a rate of about 98 pounds per hour (on an anhydrous basis) under pressure into valved line 13 from a source 14 and through a recycle line 15, wherein it admixes with recycled material, and into the absorber 12. The nitric acid and recycled liquid is sprayed from a distributor 16 disposed above the packing in the extreme upper portion of tower 12. Nitric acid, recycled liquid, and the introduced air flow concurrently down over the packing. The admixed gas and liquid is maintained at a temperature between 15° to 60° C.

The mixed liquids containing recycled material and nitric acid collect in the separating zone 17 at the bottom of the column 12. The solution will contain oxygen absorbed during passage through packed tower. In addition to providing for absorption of oxygen the foregoing treatment will also effect an oxidation of reduced nitrogen oxides, e. g. nitric oxide, formed during the oxidation of sulfides. Gas which has separated from the liquids in the separator zone 17 will flow from the tower 12 through a line 18, in which is disposed cooler 19, into a separator 20 containing baffles or other conventional separating means and will be vented from the separator 20 through valved line 21. Liquid separated in the separator 20 will be returned through the valved line 22 to the bath of liquid in separator 17.

The solution of nitric acid containing absorbed oxygen and recycled liquids is withdrawn from the tower 12 at a rate of approximately 200,000 pounds per hour through a valved line 23 and is pumped therefrom through valved line 24 by a pump 25, disposed therein, to oxidation reactor 26.

Feed stock in the present example is a mixed disulfide consisting of symmetrical and asymmetrical alkyl disulfides having two to seven carbon atoms, inclusively, in the molecule and obtained as previously described herein by steam distillation of disulfides derived from caustic extraction of a petroleum naphtha followed by oxidation of the caustic extract. The mixture is essentially free of naphtha, phenolic materials and polysulfides. The average molecular weight is about 122, corresponding to diethyl disulfides. The feed stock is flowed under pressure at a rate of 196 pounds per hour from a source 27 through a valved line 28 into the line 24 and thence into the said oxidation reactor 26. The reactor 26 is a coil which can be about five to ten feet in length and is surrounded by cooling water in a jacket 29 having conventional water inlet 30 and outlet 31.

Oxidation of the feed stock disulfides is accomplished almost instantaneously in the reactor 26. The reaction is, of course, exothermic and therefore cooling is employed to maintain temperatures below about 100° C. and preferably between about 15° and 60° C.

Liquid product is flowed from the oxidation reactor and is recycled through the line 15 to the oxygen absorber 12. The reaction product will contain a yield of sulfonic acids of about 95 mol percent of the introduced feed stock. It will also contain nitric acid depleted of oxygen and to a lesser degree some water and nitrogen oxides. It is recycled to the oxygen absorber solely for the purpose of restoring the oxygen content of the nitric acid, an amount of oxygen having been consumed in the oxidation reactor about stoichiometrically equivalent to the weight of introduced and oxidized feed stock.

Product containing nitric acid with which it is bound in a loose complex is withdrawn from the described process from a point at the junction of valved lines 23 and 24 and is pumped at a rate of 50 gallons per hour through a valved line 32 by a pump 33 into an upper portion of stripper column 34. The product liquid which is maintained at a temperature between about 80° and 140° C. and at a mild pressure flows down over hurdles or Raschig rings of said stripper column in countercurrent contact with an inert gas which is flowed under pressure from a source 35 through valved line 36 into the stripper 34 at a point near the base thereof. The inert gas is discharged into the column from a distributor 37 disposed directly beneath the packing. The inert gas strips nitrogen oxides from the countercurrently flowing product liquid and flows out of the stripper through a line 39, through a cooler 40 disposed therein, and into a scrubber 41 wherein the inert gas and stripped nitrogen oxides are scrubbed with water introduced through line 42. Inert gas is liberated through vented line 43. Aqueous solution of nitrogen oxides, being essentially a dilute solution of nitric acid, is withdrawn through valved line 44. This dilute nitric acid can be returned to the sulfide oxidation system and be added to the nitric acid in valved line 13 or it can be concentrated prior to its return to the said system. It may contain a very minor amount of sulfonic acid carried over with the stripping gas stream and so it is preferable to re-employ the dilute acid in the process.

Sulfonic acid from which bonded nitric acid or nitrogen oxides have been removed by the said stripper 34 are withdrawn from a settling zone 46 in the bottom of column 34 through a valved line 47 at a rate of about 330 pounds per hour and are delivered to storage, packing or utilization means 48. The sulfonic acid will be between 95 and 100 percent pure and will display a specific gravity of about 1.355 at 22° C. and permanganate number of between about 10 and 20 as compared to 60 for prior art processes.

The following specific examples are supplied for the purpose of illustrating the process of invention.

EXAMPLE I

Dimethyl disulfide in the quantity of 1.67 gram mols was slowly added to a 41 percent nitric acid solution containing 1.41 gram mols of nitric acid while maintaining an oxygen pressure of from 2 to 3 pounds per square inch gage of oxygen in the system. The reaction temperature was maintained between about 30° and 45° C. by the vigorous application of cooling to the system. Oxidation of the disulfide was effected by the absorption of 3.16 cubic feet of oxygen. The total quantity of disulfide was added to the nitric acid and reaction was completed after a period of six hours. It was found that 2.1 cubic feet of oxygen per 100 milliliters of the reactant was consumed, corresponding, within experimental error, to theoretical requirement of oxygen.

The product was stripped with nitrogen at a temperature between 80° and 100° C. to yield an odorless methane sulfonic acid of nearly water white color, 94 percent acidity and a specific gravity of 1.475. The product contained substantially no sulfur acid, and had a permanganate number of 1.5.

EXAMPLE II

Diethyl disulfide in a quantity of 1.5 gram mols was slowly added to 1.3 gram mols of nitric acid in a 41 percent aqueous solution. A temperature of about 25° to 35° C. was maintained in the reaction zone which was under a pressure of oxygen of 2.0 pounds per square inch gage. The test was operated for a period of seven hours. The product was stripped of bonded nitric acid in the manner outlined in Example I. A yield of 86 percent based on the disulfide of an odorless, very light yellow color acid having a specific gravity of 1.360 at 22° C. and containing only a trace of sulfuric acid was thereby obtained. A stoichiometric equivalent of oxygen based on the oxidized disulfide was consumed, 3.14 cubic feet of oxygen having been absorbed during the entire run and 1.68 cubic feet of oxygen having been consumed per 100 milliliters of diethyl disulfide. The ratio of pounds of recovered sulfonic acid per pound of nitric acid maintained in the system was 3.7. The acid, which has a permanganate number of 1.5, remained colorless after a period of about two weeks.

EXAMPLE III

Diisopropyl disulfide in a quantity of 1.02 gram mols was added to 1.3 gram mols of nitric acid in a 41 percent aqueous solution containing absorbed oxygen in a reaction zone under a pressure of 2 pounds per square inch gage of oxygen. After a reaction period of about two hours during which time the temperature was between about 25° and 40° C., a yield of 92 percent of the sulfonic acid was obtained. This acid was 98 percent isopropyl sulfonic acid having a specific gravity at 25° C. of 1.275, a sulfuric acid content of 0.73 percent and a permanganate number of 3. The stripped acid was colorless and odorless.

EXAMPLE IV

Mixed disulfides as hereinbefore defined and which were pretreated with sulfuric acid and steam distilled were oxidized in the manner described above, thereafter stripped with nitrogen, and a 94 percent yield of a mixed alkanesulfonic acid was obtained having a specific gravity at 25° C. of 1.345, a sulfuric acid content of 0.64 percent by weight and a permanganate number of 6.

EXAMPLE V

A series of runs was made examining the effect of varying the oxidation temperature. As shown in the table below, oxidation temperatures within the employed range of 25° to 70° C. provided substantially uniform product quality and yields revealed no significant deviation in product quantity or quality. Mixed disulfides of the type hereinbefore described were employed as feed stock.

Table 1

| Run | 1 | 2 | 3 | 4 | 5 |
|---|---|---|---|---|---|
| Feed, mols | 1.0 | 1.61 | 1.02 | 0.6 | 0.3 |
| Nitric acid, percent conc | 41 | 41 | 41 | 41 | 41 |
| Nitric acid, mols | 1.3 | 1.26 | 1.26 | 1.26 | 1.18 |
| Temperature, °C | 25–35 | 30–40 | 40–60 | 50–65 | 50–70 |
| Ft.$^3$ O$_2$ absorbed | 2.09 | 3.3 | 2.5 | 1.18 | 0.765 |
| Pressure, p. s. i. g | 2 | 2 | 2 | 2 | 2 |
| Time, hours | 6 | 6 | 5½ | 7 | 3 |
| Ft.$^3$ O$_2$/100 ml. RSSR | 1.71 | 1.66 | 1.56 | 1.58 | 1.65 |
| Theory, ft.$^3$ O$_2$ | 1.6 | 1.6 | 1.6 | 1.6 | 1.6 |
| Pounds RSO$_3$H/lb. HNO$_3$ | 3.2 | 4.4 | 2.6 | | |
| Acid yield, mol percent | 95 | 95 | 86 | | |
| Properties of the Product: | | | | | |
| Percent RSO$_3$H | 95.5 | 96 | 95 | 99.5 | 99.3 |
| Sp. Gr. at 22° C | 1.355 | 1.355 | 1.355 | 1.355 | 1.355 |
| Percent H$_2$SO$_4$ | 0.33 | 0.25 | 0.42 | 0.64 | 0.83 |
| Permanganate Number | 19 | 18 | 22 | 18 | 23 |
| Color,[1] NPA after 2 weeks | 2½–3 | 1½–2 | 3 | | |

[1] The N. P. A. color as determined by test D155-39T of the A. S. T. M.

EXAMPLE VI

A series of runs was made examining the effect of varying the concentration of nitric acid between about 35 percent and 70 percent. The results of these runs are reported in Table 2. Substantially uniform yields and product quality were obtained at the acid concentration within the employed range. However, an increase in N. P. A. color of product is observed with increase in acid concentration. At lower pressures, lower concentrations of nitric acid within the given range are preferred.

Table 2

| Run | 6 | 7 | 8 | 9 |
|---|---|---|---|---|
| Feed, mols | 0.8 | 1.31 | 1.02 | 0.37 |
| Nitric acid, percent conc | 35 | 41 | 55 | 70 |
| Nitric acid, mols | 1.3 | 1.3 | 1.3 | 2 |
| Temperature, °C | 35–40 | 25–40 | 25–35 | 20–30 |
| Ft.$^3$ O$_2$ absorbed | | 2.5 | 1.98 | |
| Pressure, p. s. i. g | 2 | 2 | 2 | 2 |
| Time, hours | 2 | 5½ | 5 | 2½ |
| Ft.$^3$ O$_2$/100 ml. RSSR | | 1.56 | 1.6 | |
| Pounds RSO$_3$H/lb. HNO$_3$ | 2.3 | 3.4 | 2.6 | 0.67 |
| Acid yield, mol percent | 95 | 93 | 93 | 98 |
| Properties of Acid: | | | | |
| Percent R$_2$SO$_3$H | 95.3 | 95.3 | 96 | 97 |
| Sp. Gr. at 22° C | 1.355 | 1.355 | 1.355 | 1.355 |
| Percent H$_2$SO$_4$ | | 0.36 | 0.33 | 0.56 |
| Permanganate Number | 17 | 16 | 17 | 16 |
| Color,[1] NPA after 2 weeks | 1½–2 | 2–2½ | 3 | 3½ |

[1] The N. P. A. color as determined by test D155-39T of the A. S. T. M.

EXAMPLE VII

This example illustrates one set of optimum conditions providing high yields of premium quality product. As feed stock there was employed mixed disulfides of the type used in Examples V and VI and hereinbefore described as a mixture of dialkyl disulfides obtained as a by-product in the extraction of mercaptans from petroleum distillates with a caustic solutizer solution followed by regeneration of the solution in the presence of an oxidation catalyst. The mixture of dialkyl disulfides was separated from the caustic solution by extraction with a petroleum solvent. The mixed disulfides were stirred with 10 percent by volume, based on the disulfides, of 95 percent sulfuric acid at approximately room temperature. The mixture was permitted to settle and a lower acid layer was withdrawn. The raffinate was water washed to remove sulfuric acid and was percolated through clay.

A gram mol of the so-treated disulfide mixture was slowly added to 1.3 gram mols of nitric acid in 41 percent concentration over a period of two hours. The temperature was maintained between 35° and 42° C. and the pressure at 2.5 pounds per square inch gage. Oxygen was slowly introduced during the two-hour reaction period.

A yield of mixed sulfonic acids of 97 percent by weight of feed stock was obtained. This product assayed 98 percent sulfonic acids. It was odorless and colorless, having an N. P. A. color of only 0 to ½ even after standing for two weeks.

The utility of an acid pretreatment is clearly demonstrated by the foregoing example. Preferred operation, according to the present invention, will therefore include this pretreatment of feed stock to insure highest quality product.

Having described our invention, we claim:

1. An improved process for producing a hydrocarbon sulfonic acid which comprises introducing into an absorption zone a gas containing free oxygen, absorbing the oxygen in liquid catalytic medium consisting of nitric acid of a concentration between about 10 and 70 percent, introducing the nitric acid containing absorbed oxygen into a reaction zone and adding thereto about one mol per mol of oxygen of an organic sulfur compound having the formula $RS_nR'$ wherein R and R' are hydrocarbon radicals and $n$ is an integer between 1 and 6, inclusively at a controlled rate effecting substantially instantaneous oxidation of the said sulfur compound to a sulfonic acid so that the mol ratio of nitric acid to added organic sulfur compound is at least 1 while maintaining a reaction temperature of between 10° and 130° C.

2. The process of claim 1 in which the catalytic medium containing the hydrocarbon sulfonic acid is recycled to a further contact with an additional quantity of oxygen and in which oxygen is absorbed in recycled medium at a rate substantially equivalent to its consumption in the oxidation of the said organic sulfur compound.

3. The process of claim 1 in which $n$ is 2.

4. The process of claim 1 in which R and R' are each alkyl radicals having 1 to 5 carbon atoms inclusively.

5. The process of claim 1 wherein the organic compound is a dialkyl disulfide.

6. An improved process for producing a hydrocarbon sulfonic acid which comprises introducing a gas containing free oxygen into an absorption zone, absorbing the oxygen into a fluid catalytic medium consisting of nitric acid in a concentration between about 10 and 70 percent, adding to the nitric acid containing oxygen, in a reaction zone, an organic sulfur compound having the formula $RS_nR'$ wherein R and R' are hydrocarbon radicals and $n$ is an integer between 1 and 6, inclusively, at a rate not greater than the maximum rate of oxidation of the sulfur compound in the reaction zone under reaction conditions and at such a said rate that a mol ratio of at least 1 mol of nitric acid per mol of unoxidized sulfur compound is maintained in the reaction zone, maintaining a temperature between about 15° and 70° C. in the reaction zone and effecting by said addition substantially immediate and complete oxidation of the said sulfur compound to a sulfonic acid.

7. An improved process for producing a hydrocarbon sulfonic acid which comprises introducing a gas containing free oxygen into an absorption zone, absorbing the oxygen into a fluid catalytic medium consisting of nitric acid in a concentration between about 10 and 70 percent, adding to the nitric acid containing oxygen, in a reaction zone, an organic sulfur compound having the formula $RS_nR'$ wherein R and R' are hydrocarbon radicals and $n$ is an integer between 1 and 6, inclusively, at a rate not greater than the maximum rate of oxidation of the sulfur compound in the reaction zone under reaction conditions and at such a said rate that a mol ratio of at least 1 mol of nitric acid per mol of unoxidized sulfur compound is maintained in the reaction zone, maintaining a temperature between about 15° and 70° C. in the reaction zone, effecting by said addition substantially immediate and complete oxidation of the said sulfur compound to a sulfonic acid, the said acid product forming a nitric-sulfonic acid complex, flowing an inert gas through the said complex to strip the nitric acid therefrom, and recovering substantially pure hydrocarbon sulfonic acid as a residue.

8. An improved process for producing an alkyl sulfonic acid which comprises introducing a gas containing free oxygen into an absorption zone, absorbing the oxygen into a fluid catalytic medium consisting of nitric acid in a concentration between about 10 and 70 percent, and adding to the nitric acid containing oxygen, in a reaction zone, a dialkyl disulfide at a rate slow enough to prevent accumulation of unreacted disulfide in the reaction zone and to maintain a mol ratio of nitric acid to unoxidized disulfide of about 1, employing a total relative amount of nitric acid equivalent to between about 0.1 and 10.0 mols per mol of the said disulfide, maintaining a temperature in the said zone between about 15° and 70° C., effecting by said addition of dialkyl disulfide into a relatively large volume of nitric acid containing oxygen, a substantially immediate and complete oxidation of the said dialkyl disulfide to a sulfonic acid, the said acid product forming a nitric-acid complex, flowing an inert gas through at least a portion of the said acid product to strip nitric acid therefrom, recovering substantially pure alkyl sulfonic acid as a residue, recycling nitric acid to the said absorption zone therein admixing gas containing free oxygen with the recycled product and thus replenishing the nitric acid with at least a molar equivalent of absorbed oxygen based on the quantity of oxidized dialkyl disulfide.

9. An improved process for producing a hydrocarbon sulfonic acid which comprises adding an organic sulfur compound having the formula $RS_nR'$ wherein R and R' are hydrocarbon radicals and $n$ is an integer between 1 and 6, inclusively, to a sufficient volume of liquid nitric acid in a concentration between about 10 and 70 percent, and having free oxygen absorbed therein, at a controlled rate effecting substantially instantaneous oxidation of the said sulfur compound to a sulfonic acid.

10. An improved process for producing a hydrocarbon sulfonic acid which comprises adding an organic sulfur compound having the formula $RS_nR'$ wherein R and R' are hydrocarbon radicals and $n$ is an integer between 1 and 6, inclusively, to the liquid medium consisting of free-oxygen-containing nitric acid in a concentration between 10 and 70 percent, the total volume of nitric acid being between 0.1 and 10.0 mols per mol of total sulfur compound treated, at a controlled rate effecting substantially immediate oxidation of the said sulfur compound.

11. An improved process for producing a hydrocarbon sulfonic acid which comprises adding an organic sulfur compound having the formula $RS_nR'$ wherein R and R' are hydrocarbon radicals and $n$ is an integer between 1 and 6, inclusively, to a liquid reaction medium consisting of nitric acid having free oxygen absorbed therein at a rate such that the mol ratio of nitric acid to non-oxidized sulfur compound in the reaction zone is maintained at at least 1, the total volume of employed nitric acid being between about 0.1 and 10.0 mols of acid per mol of treated sulfur compound, and effecting substantially immediate oxidation of the said sulfur compound.

References Cited in the file of this patent

UNITED STATES PATENTS

| Number | Name | Date |
| --- | --- | --- |
| 2,204,210 | Farlow | June 11, 1940 |
| 2,489,318 | Proell | Nov. 29, 1949 |
| 2,505,910 | Proell | May 2, 1950 |
| 2,567,399 | Proell | Sept. 11, 1951 |